United States Patent [19]

Bennett, III et al.

[11] Patent Number: 5,285,526
[45] Date of Patent: Feb. 8, 1994

[54] METHOD OF MANIPULATING ELEMENTS OF A STRUCTURED DOCUMENT, FUNCTION KEY OPERATION BEING DEPENDENT UPON CURRENT AND PRECEDING IMAGE ELEMENT TYPES

[75] Inventors: Clayton J. Bennett, III, Rockville, Md.; Davis A. Foulger, Wappinger Falls, N.Y.; Eric M. Hesse, Gaithersburg, Md.; David W. Walsh, Farmers Branch, Tex.

[73] Assignee: International Business Machines Corporation, Armonk, N.Y.

[21] Appl. No.: 940,732

[22] Filed: Sep. 3, 1992

Related U.S. Application Data

[63] Continuation of Ser. No. 344,332, Apr. 26, 1989, abandoned.

[51] Int. Cl.⁵ .............................................. G06F 13/10
[52] U.S. Cl. ................................... 395/100; 395/118; 395/146; 395/155; 395/600; 364/928; 364/928.3; 364/946.2; 364/947; 364/947.5; 364/949; 364/943; 364/943.43; 364/943.44; 364/DIG. 2
[58] Field of Search .................. 364/DIG. 1, DIG. 2; 395/100, 118, 144, 145, 146, 148, 155, 600

[56] References Cited

U.S. PATENT DOCUMENTS

| | | | |
|---|---|---|---|
| 4,189,727 | 2/1980 | Vaughn, Jr. | 340/711 |
| 4,503,499 | 3/1985 | Mason et al. | 364/200 |
| 4,686,649 | 8/1987 | Rush et al. | 364/419 |
| 4,949,300 | 8/1990 | Christenson et al. | 395/145 |
| 4,970,678 | 11/1990 | Sladowski et al. | 364/900 |
| 4,992,972 | 2/1991 | Brooks et al. | 364/900 |
| 5,003,473 | 3/1991 | Richards | 364/408 |
| 5,062,060 | 10/1991 | Kolnick | 395/159 |

Primary Examiner—Thomas C. Lee
Assistant Examiner—Maria N. Von Buhr
Attorney, Agent, or Firm—John E. Hoel

[57] ABSTRACT

A method is described for manipulating commonly used elements within a structured document. The method takes advantage of a user's intent in selecting certain keystrokes to complete a task. By making assumptions on the user's intent at the current position within the document and dynamically changing the functions of keystrokes based on those assumptions, the method allows the user to quickly and easily manipulate the commonly used elements of a structured document without having to specify any tag names or markup language, and without having to understand the rules for creating a structured document.

31 Claims, 8 Drawing Sheets

FIG. 2

[p]WE HOLD THESE TRUTHS TO BE SELF-EVIDENT, THAT ALL MEN ARE CREATED EQUAL, THAT THEY ARE ENDOWED BY THEIR CREATOR WITH CERTAIN UNALIENABLE RIGHTS, THAT AMONG THESE ARE [/p] — PARAGRAPH 28
[LIST]
 [LI] LIFE, [/LI] ← 32
 [LI] LIBERTY AND [/LI] ← 34 — LIST 30
 [LI] THE PURSUIT OF HAPPINESS. [/LI] ← 36
[/LIST]
[p]THAT TO SECURE THESE RIGHTS, GOVERNMENTS ARE INSTITUTED AMONG MEN, DERIVING THEIR JUST POWERS FROM THE CONSENT OF THE GOVERNED. [/p] — PARAGRAPH 38

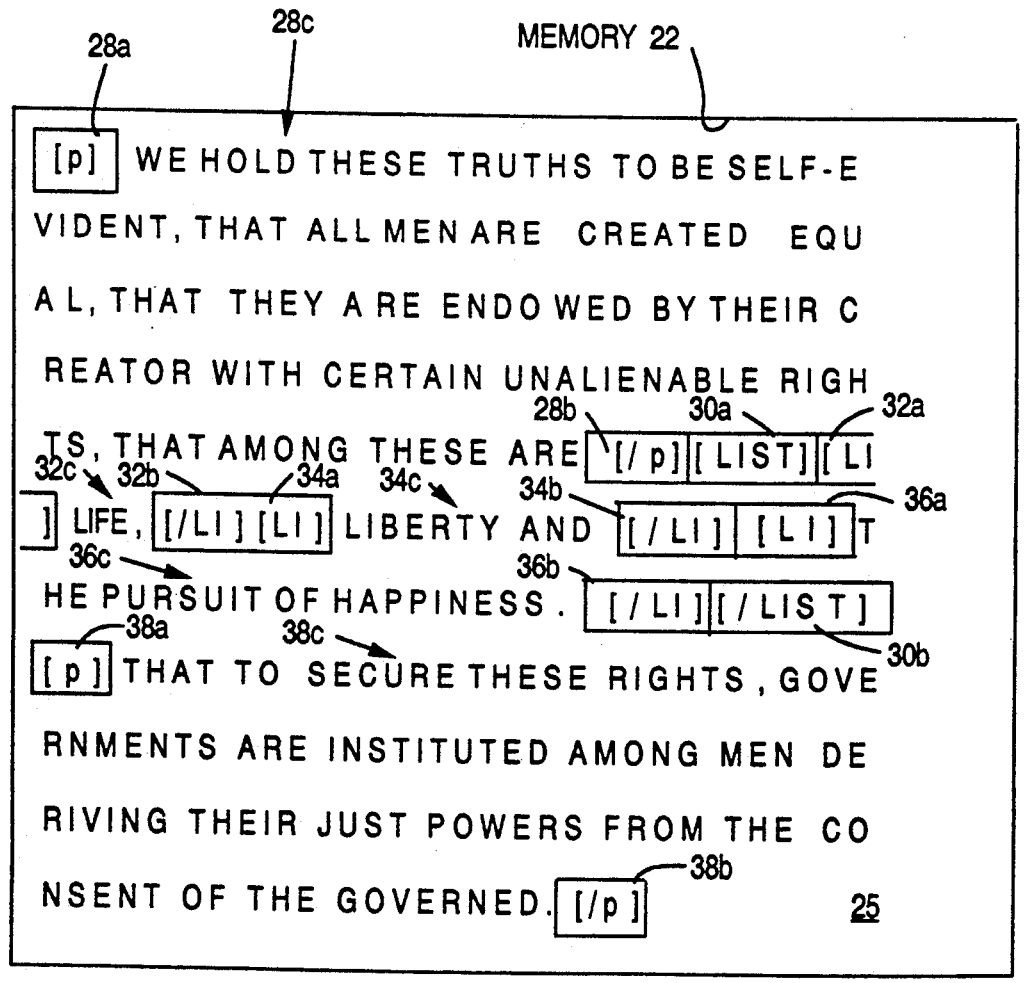

FIG. 4

MEMORY 22

| MEMORY ADDRESS | ENTER KEY - PROGRAM INSTRUCTION ROUTINES 24 |
|---|---|
| 2000 (24a) | IF THE CURRENT DOCUMENT POSITION IS IN A LIST ITEM ELEMENT AND<br>IF THE CURRENT DOCUMENT POSITION IS WITHIN ANY TEXT<br>THEN<br>1) SET THE CURRENT DOCUMENT POSITION TO THE DOCUMENT POSITION WHICH IMMEDIATELY FOLLOWS THE LIST ITEM END TAG<br>2) INSERT A NEW LIST ITEM ELEMENT AT THE CURRENT DOCUMENT POSITION<br>3) POSITION THE CURSOR AT THE DOCUMENT POSITION WHICH IMMEDIATELY FOLLOWS THE BEGIN TAG FOR THE NEW LIST ITEM . |
| 2050 (24b) | IF THE CURRENT DOCUMENT POSITION IS IN A PARAGRAPH ELEMENT AND<br>IF THE CURRENT DOCUMENT POSITION IS WITHIN ANY TEXT<br>THEN<br>1) SET THE CURRENT DOCUMENT POSITION TO THE DOCUMENT POSITION WHICH IMMEDIATELY FOLLOWS THE PARAGRAPH END TAG<br>2) INSERT A NEW PARAGRAPH ELEMENT AT THE CURRENT DOCUMENT POSITION<br>3) POSITION THE CURSOR AT THE DOCUMENT POSITION WHICH IMMEDIATELY FOLLOWS THE BEGIN TAG FOR THE NEW POSITION. |

FIG. 5

54 — CURSOR LOCATION WHEN ENTER KEY 52 HIT

[p]WE HOLD THESE TRUTHS TO * BE SELF-EVIDENT, THAT ← 28
ALL MEN ARE CREATED EQUAL, THAT THEY ARE ENDOWED BY
THEIR CREATOR WITH CERTAIN UNALIENABLE RIGHTS, THAT
AMONG THESE ARE [/p]
[ LIST ]
   [ LI ] LIFE, [ / LI ] ← 30
   [ LI ] LIBERTY AND [ / LI ]
   [ LI ] THE PURSUIT OF HAPPINESS. [ / LI ]
[ / LIST ]
[p]THAT TO SECURE THESE RIGHTS, GOVERNMENTS ARE ← 38
INSTITUTED AMONG MEN, DERIVING THEIR JUST POWERS
FROM THE CONSENT OF THE GOVERNED. [/p]

FIG. 6

[p]WE HOLD THESE TRUTHS TO BE SELF-EVIDENT, THAT  ←— 28
ALL MEN ARE CREATED EQUAL, THAT THEY ARE ENDOWED BY
THEIR CREATOR WITH CERTAIN UNALIENABLE RIGHTS, THAT
AMONG THESE ARE [/p]
[P] * [/P]  ←— 29   BEGIN TAG AND END TAG ARE INSERTED FOR NEW PARAGRAPH
[ LIST ]
   [ LI ] LIFE, [ / LI ]
   [ LI ] LIBERTY AND [ / LI ]  ←— 30
   [ LI ] THE PURSUIT OF HAPPINESS. [ / LI ]
[ / LIST ]
[p]THAT TO SECURE THESE RIGHTS, GOVERNMENTS ARE  ←— 38
INSTITUTED AMONG MEN, DERIVING THEIR JUST POWERS
FROM THE CONSENT OF THE GOVERNED. [/p]

FIG. 7

[p]WE HOLD THESE TRUTHS TO BE SELF-EVIDENT, THAT  ←— 28
ALL MEN ARE CREATED EQUAL, THAT THEY ARE ENDOWED BY
THEIR CREATOR WITH CERTAIN UNALIENABLE RIGHTS, THAT
AMONG THESE ARE [/p]
[ LIST ]   ←— 32   LOCATION OF CURSOR 54 WITHIN LIST ITEM 34 WHEN ENTER KEY 52 HIT
   [ LI ] LIFE, [ / LI ]   ←— 34
   [ LI ] LIBERTY * AND [/ LI ]   ←— 36
   [ LI ] THE PURSUIT OF HAPPINESS. [ / LI ]
[ / LIST ]
[p]THAT TO SECURE THESE RIGHTS, GOVERNMENTS ARE  ←— 38
INSTITUTED AMONG MEN, DERIVING THEIR JUST POWERS
FROM THE CONSENT OF THE GOVERNED. [/p]

FIG. 8

[p]WE HOLD THESE TRUTHS TO BE SELF-EVIDENT, THAT  ←— 28
ALL MEN ARE CREATED EQUAL, THAT THEY ARE ENDOWED BY
THEIR CREATOR WITH CERTAIN UNALIENABLE RIGHTS, THAT   ←— 30
AMONG THESE ARE [/p]
[ LIST ]
   [ LI ] LIFE, [ / LI ]   ←— 32   BEGIN TAG AND END TAG ARE INSERTED FOR NEW LIST ITEM 35
   [ LI ] LIBERTY AND [ / LI ]   ←— 34
   [ LI ] * [ /LI ]
   [ LI ] THE PURSUIT OF HAPPINESS. [ / LI ]   ←— 36
[ / LIST ]
[p]THAT TO SECURE THESE RIGHTS, GOVERNMENTS ARE  ←— 38
INSTITUTED AMONG MEN, DERIVING THEIR JUST POWERS
FROM THE CONSENT OF THE GOVERNED. [/p]

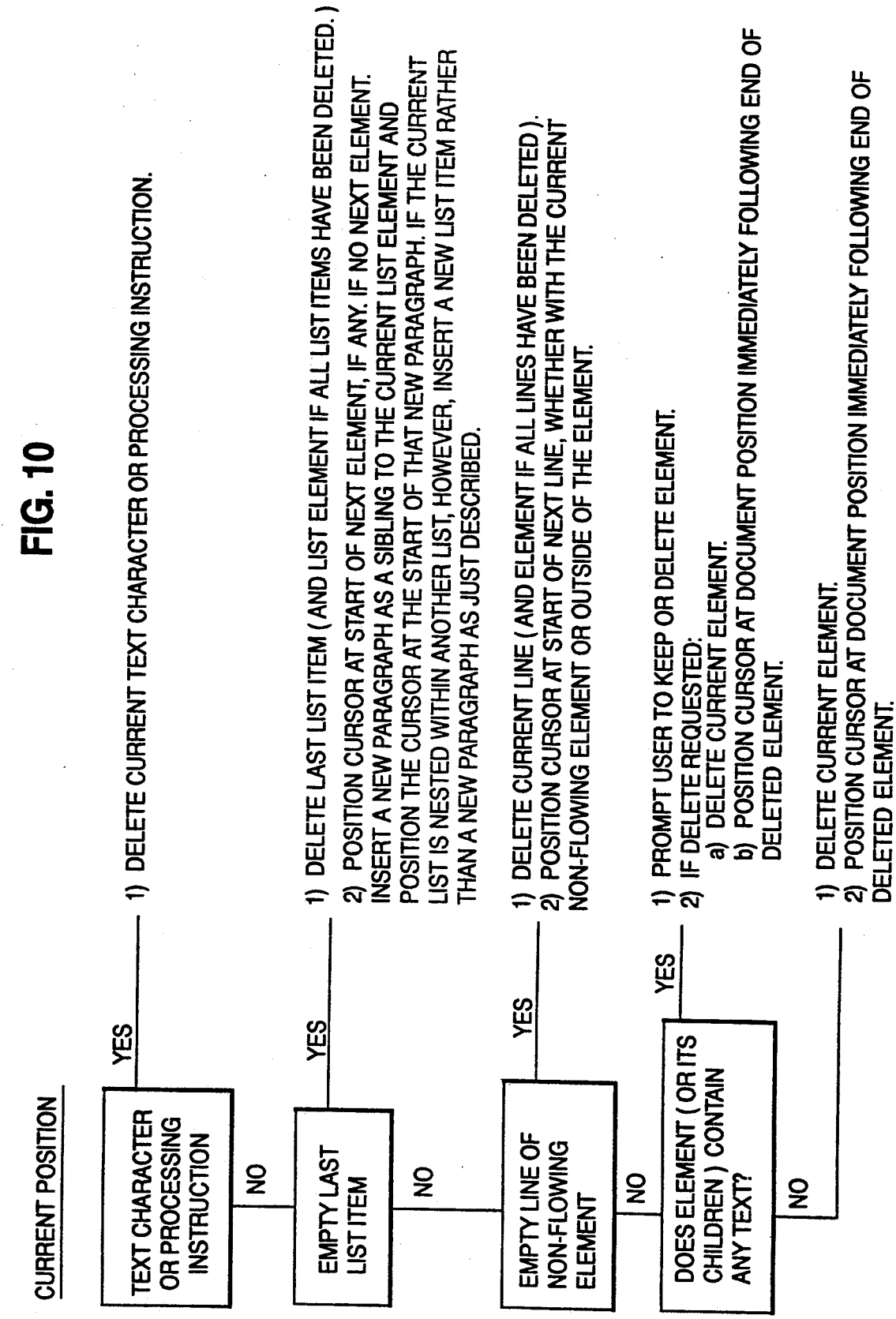

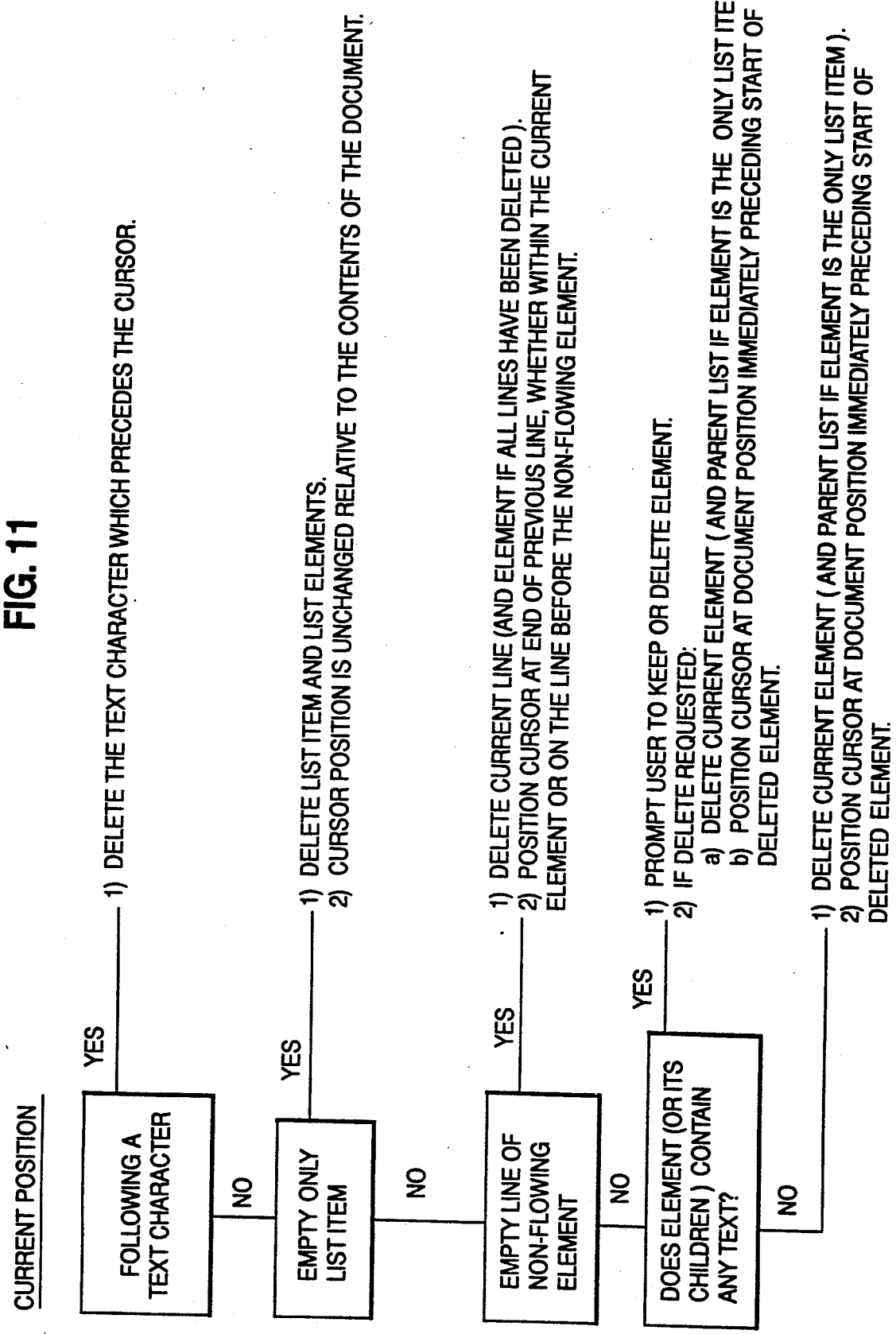

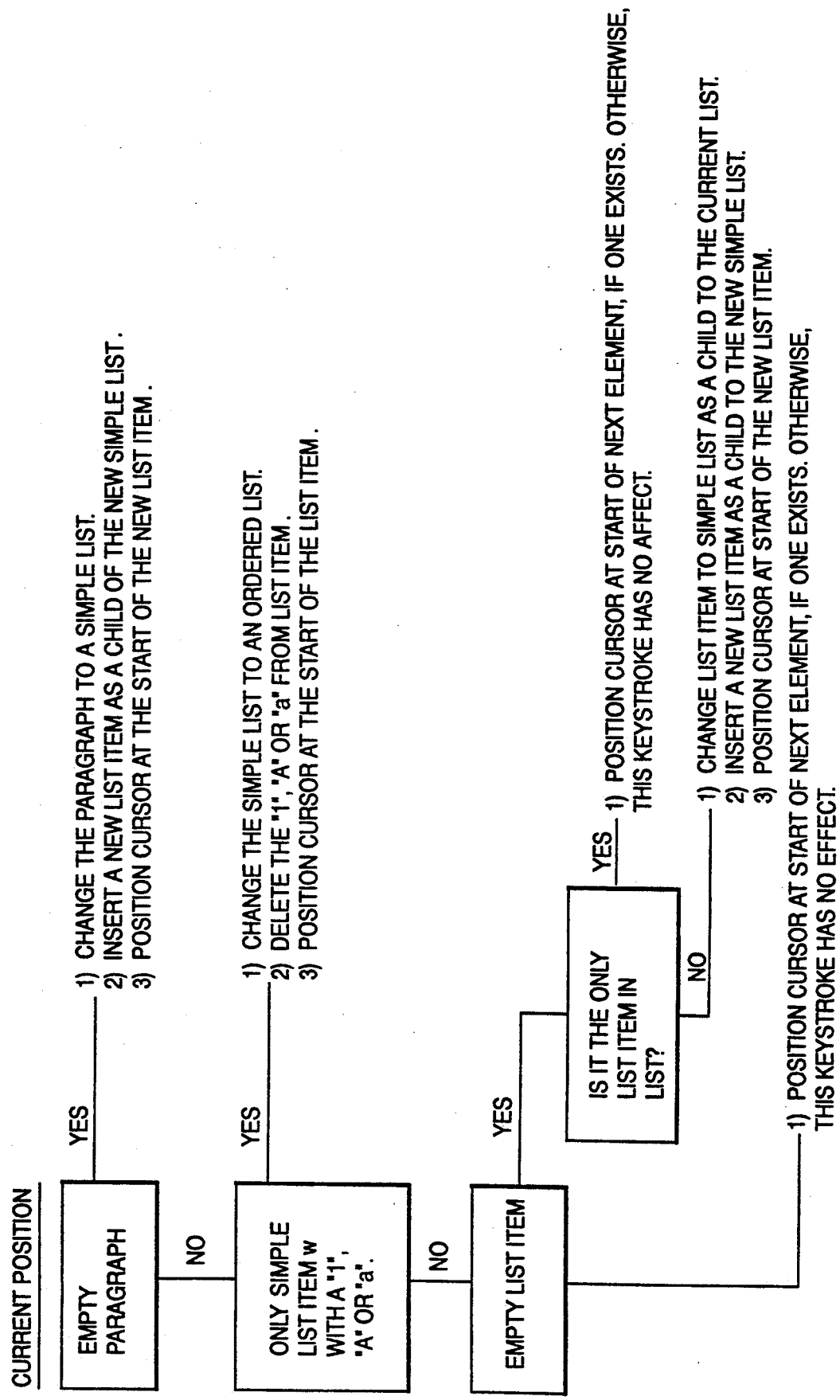

METHOD OF MANIPULATING ELEMENTS OF A STRUCTURED DOCUMENT, FUNCTION KEY OPERATION BEING DEPENDENT UPON CURRENT AND PRECEDING IMAGE ELEMENT TYPES

This is a continuation of application Ser. No. 07/344,332, filed Apr. 26, 1989, now abandoned.

FIELD OF THE INVENTION

The invention disclosed broadly relates to data processing methods and, more particularly, it relates to a method for manipulating commonly used elements within a structured document.

BACKGROUND OF THE INVENTION

The editing of structured documents necessitates the users' understanding of both the names of the tags provided by the markup language and the rules by which those tags are used to structure the content of the document. Learning the tags and structuring rules for even one markup language, however, is not enough to keep up with today's quickly advancing business world. As the world's documents become more and more complex, new tags and structuring rules are constantly being generated to accommodate this growing complexity. As a result, it has become increasingly difficult for new users of a structured document editor to become productive within only a few hours. In many cases, days or even weeks of training is required before users are ready to send even simple notes and documents. The invention described herein allows the user to become productive in creating simple notes and documents almost immediately without having to learn anything about document structure and tag names.

Terminology

The following terminology is used throughout this description:

SGML

Standardized General Markup Language. A markup language consisting of tags used to prepare structured documents. Refer to International Standards Organization standard 8879-1986 for definition and details.

Structured Document

A document prepared in accordance with an SGML-compliant type definition.

Element

SGML-defined entity consisting of a begin tag and its contents, and including an end tag, when necessary.

Empty Element

An element whose contents are null, containing neither text nor other elements.

Current Document Position

The document position which determines the focal point for an editing operation, usually the location of the cursor.

Current Element

The innermost document element which contains the current document position. This refers to the lowest level child element within the element structure which contains the current document position. For example, in a document where the current document position exists within a List Item which is a child of a List within a Paragraph, the current element is known as the List Item (even though the document position is within all three elements), as it is the lowest level child element.

Next Element

The element represented by the next start tag found in the document when searching forward from the current document position toward the end of the document.

Previous Element

The element represented by the previous start tag found in the document when searching backward from the current document position toward the start of the document.

Non-Flowing Element

Within a WYSIWYG (what-you-see-is-what-you-get) editor, text is displayed to the user as it will appear when it is printed. This implies that formatting of the elements within the document is done when the document is displayed to the user. As a result, the text within many elements appears to automatically "flow" from one line to the next as characters are inserted into the document. Similarly, text "flows" backwards from one line to the previous line as text is deleted at the start of the element. An element in which the insertion or deletion of text characters does not cause any text to flow from one line to another is known as a "non-flowing element". As an example, the SGML "LINES" tag is known as a non-flowing element where the text is not reformatted and moved from one line to another.

Commonly Used Elements

Those elements which fall into the category of commonly used elements include Paragraphs, Simple Lists, Ordered Lists, Bulleted Lists and List Items.

Tag Name

The name given to a set of elements which all abide by the same rules of formatting. Examples of a tag name include PARAGRAPH, SIMPLE LIST, and LIST ITEM.

OBJECTS OF THE INVENTION

It is therefore an object of the invention to provide an improved method for manipulating elements within a structured document.

It is another object of the invention to provide an improved method for actively interpreting the intention of the user in manipulating elements within a structured document.

It is still a further object of the invention to enable a user to learn how to use a structured document editor more quickly than has been possible in the prior art.

SUMMARY OF THE INVENTION

These and other objects, features and advantages of the invention are accomplished by the method for manipulating elements within a structured document using active intent interpretation, as disclosed herein.

The invention describes a technique for manipulating commonly used elements within a structured document. The invention takes advantage of a user's intent in selecting certain keystrokes to complete a task. By making assumptions on the user's intent at the current position within the document and dynamically changing the functions of keystrokes based on those assumptions, this invention allows the user to quickly and easily manipulate the commonly used elements of a structured document without having to specify any tag names or markup language, and without having to understand the rules for creating a structured document.

The invention disclosed herein provides functions for a more complete manipulation of the basic elements of a document than did the prior art in this area. The prior art only supplied the dynamic modification of functions for the insertion of elements, it did not provide an adequate set of functions for easily and completely manipulating the basic elements of a document. This invention goes beyond the prior art in providing a method not only for the insertion of elements to the document, but also for the deletion of elements from the document.

In addition, the prior art was based on the user being in a mode when entering list items which kept track of the current list item number. As a result, list items inserted between existing ones within an ordered list would often cause the list items to be numbered improperly. This invention not only allows the sequential creation of list items, but also allows them to be inserted or deleted at any time and at any location within the list while automatically maintaining the proper numbering of the list items.

In summary, the invention provides the ability to interpret a user's action based upon the current document position and environment, and to invoke an appropriate response to that action based on the user's intent given the current document position.

DESCRIPTION OF THE FIGURES

These and other objects, features and advantages of the invention will be more fully appreciated with reference to the accompanying Figures.

FIG. 2 is an example of control element tags and associative text.

FIG. 3 illustrates the memory organization of control element tags and associated text.

FIG. 4 is an example of instruction routines for the enter key.

FIG. 5 is an example of hitting the enter key when the cursor is within the text of a paragraph.

FIG. 6 is an example result from FIG. 5, inserting a new paragraph.

FIG. 7 is an example of hitting the enter key when the cursor is within the text of a list item.

FIG. 8 is an example result from FIG. 7, inserting a new list item.

FIG. 10 is a flow diagram for delete key functions.

FIG. 11 is a flow diagram for backspace key functions.

FIG. 12 is a flow diagram for tab key functions.

DISCUSSION OF THE PREFERRED EMBODIMENT

Figure 1:
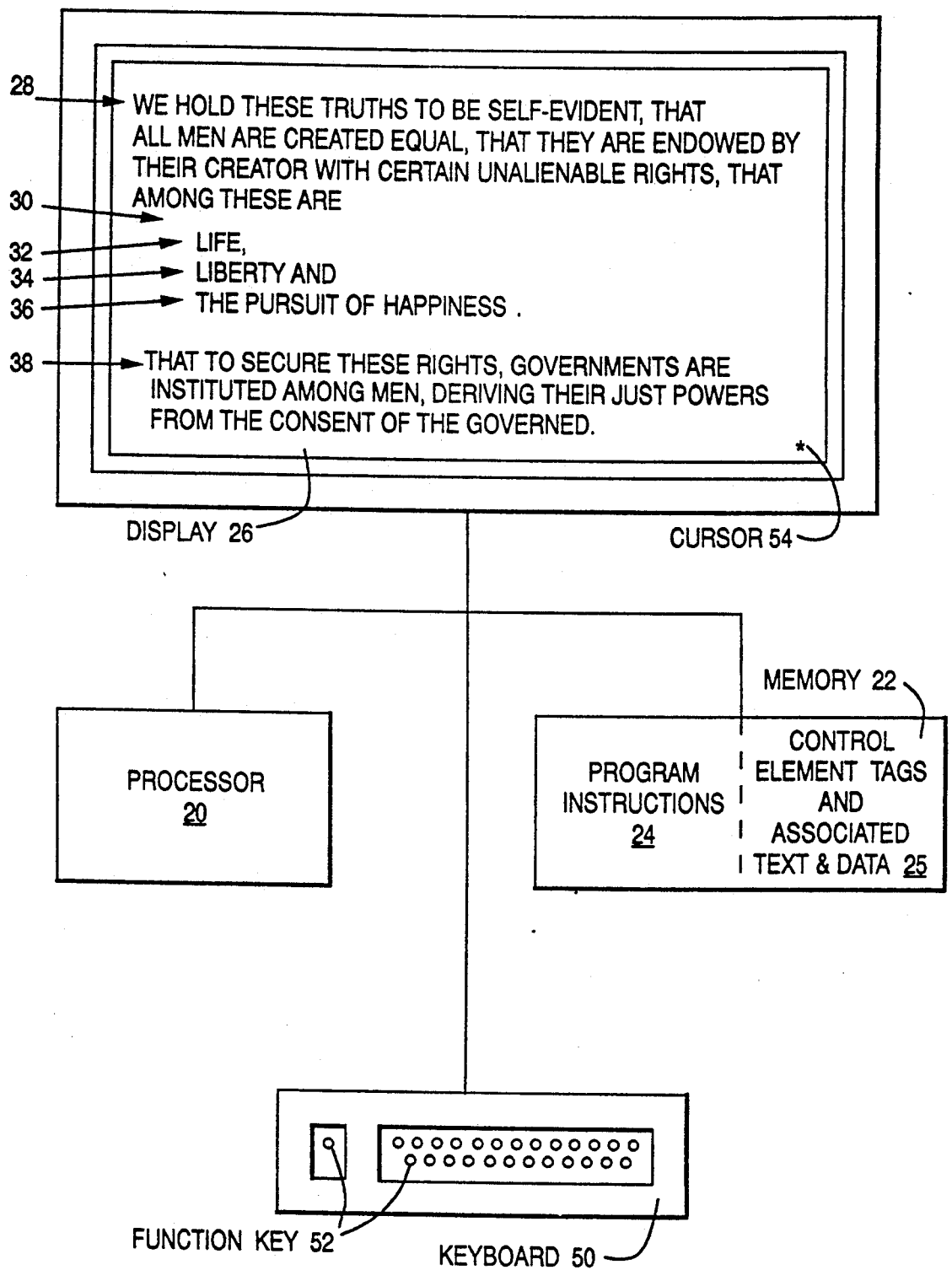
FIG. 1 is a system block diagram of the document editing system.

The document editing system shown in FIG. 1 includes a processor 20 and a memory 22, both coupled to the keyboard 50 and the display 26. The processor 20 executes program instructions 24 stored in the memory 22. The display device 26 coupled to the processor 20 displays in WYSIWYG form, a plurality of document images such as paragraphs 28 and 38, the list 30, which includes the list items 32, 34 and 36, shown in the display 26 of FIG. 1. Images can include lists which are either unordered or ordered, and images can also include graphics as well as text. The document images 28-38 are displayed in an ordered sequence, as can be seen in FIG. 2, using structured document notation, where the ordered sequence is specified by a corresponding ordered sequence of a plurality of image control elements or tags. The paragraph 28 in FIG. 2 is shown in the structured document notation at begin tag [p], and at end tag [/p]. Each image such as the paragraph 28 shown in FIG. 2, is a structured document element having a begin tag [p], the text (of the paragraph in this example), and then an end tag [/p]. The begin tag and the end tag serve as an image type value, in this case indicating a paragraph. The order of occurrence of the paragraph 28 as occurs on the display 26, is determined by the order of occurrence of the structured document element representing that paragraph 28 shown in FIG. 2, within the context of the order of occurrence of the other structured document elements such as for the list 30 and for the list 38. This order of occurrence of the structured document elements is a sequence indication. In accordance with the invention, the image type value and the sequence indication for a structured document element, which has been identified as corresponding to the location of the cursor 54, are used to determine which of a plurality of functions are to be executed when the user actuates a particular function key.

The order of occurrence of the structured document elements such as the paragraph 28, list 30 and the paragraph 38, can be determined by their order of storage in the memory 22 as shown in FIG. 3. FIG. 3 shows that the control element tags and associated text 25 of FIG. 2 have been stored in the memory 22 in a linear sequential order. The paragraph 28 is represented by the begin tag 28A and the end tag 28B which surrounds the paragraph text 28C. The list 30 represented by begin tag 30A and the end tag 30B and the information contained therebetween, has been stored in the next consecutive memory locations in the memory 22, after the location of the paragraph 28. This would provide a sequence indication for the paragraph 28 and the list 30.

Contained within the list 30, between the begin tag 30A and the end tag 30B, are the list item elements 32, 34 and 36. The list item element 32 is represented by the begin tag 32A and the end tag 32B, between which is located the text 32C. The list item element 34 is represented by the begin tag 34A and the end tag 34B, and between which lies the text 34C. The list item element 36 is represented by the begin tag 36A, the end tag 36B and the text lying therebetween, 36C.

Located in consecutive memory locations following the list 30, is the paragraph 38 which consists of the begin tag 38A and the end tag 38B, between which lies the text portion 38C.

In an alternate embodiment of the invention, the sequence of image control elements can have threaded addresses, which can go both in the forward direction and in the reverse direction, so that each respective image control element contains the prior address of the preceding image control element and the next address for the next occurring image control element. In this manner, the program instructions can progress along the sequence of image control elements in the same order as for their corresponding images as they occur in the display 26.

The location of the cursor 54 within the text 25 is determined by a pointer which sequentially points to consecutive memory locations in the memory 22 where the text 25 is stored.

The keyboard 50 is coupled to a processor 20, and can have one or more function keys 52, such as the Enter key, the Backspace key, the Delete key, the Tab key, various alphanumeric or symbol keys, and the like. The display device 26 includes a cursor 54, displayed thereon, at a current document position in the sequence of images 28 through 38, where a result of actuating the function key 52 is to have effect.

The invention is a method for selecting one of a plurality of editing functions to be performed when the function key is actuated, based upon the location of the cursor 54, in the sequence of images.

A plurality of instruction routines, such as 24A and 24B, shown in FIG. 4, are stored in the memory 22, each routine corresponding to one of a plurality of editing functions, which can be performed by the same function key 52. For example, as is shown in FIG. 4, two different instruction routines for the Enter key are shown, the routine 24A corresponding to the occurrence of the cursor being within the text of a list item element, when the Enter key is actuated. The second routine 24B of FIG. 4 is for the occurrence of the cursor being within the text portion of a paragraph element, when the Enter key is actuated.

FIGS. 5 and 6 show a first example of the operation of the invention. In FIG. 5, at least a first portion of the plurality of document images is displayed on the display device corresponding to at least a first portion of the plurality of image control elements, so that paragraph 28, list 30, and paragraph 38 are displayed. The cursor 54 is displayed at a selected current document position within the text portion of the paragraph 28. In accordance with the invention, the focal image element 28, is identified out of the plurality of image elements 28 through 38, having a sequence location corresponding to the selected current document position of the cursor 54. Then, a selected instruction routine 24B of FIG. 4 is accessed from the plurality of instruction routines in the memory 22, based upon the control element tag type of the focal image element being a paragraph element 28. Then, the accessed instruction 24B is executed to perform the selected editing function, whose result is shown in FIG. 6. The instruction routine 24B determines that the current document position is in paragraph element 28, and that the current document position is within text, and then it sets the current document position to the document position which immediately follows the paragraph end tag 28B for paragraph 28. It inserts a new paragraph element 29 at the current document position, and then it positions the cursor 54 at the document position which immediately follows the begin tag for the new paragraph 29. The image control elements have been altered in memory 22 to add the new paragraph begin tag and end tag, corresponding to a new paragraph 29. In this manner, the Enter key has achieved a first editing result, based upon a first occurring location of the cursor when the Enter key was actuated.

A second example for the Enter key is shown in FIGS. 7 and 8, where the Enter key is actuated when the cursor is within text of a list item 34. In this second example, the instruction routine 24A of FIG. 4 is accessed, based upon the image element type being a list item 34, and the cursor being within the text portion of the list item 34, as is seen in FIG. 7. The result of executing the instruction routine 24A is shown in FIG. 8, where a new list item element 35 is inserted between the existing list item element 34 and the existing list item element 36. In executing the instruction routine 24A, the program instructions determine that the cursor is in the list item element 34 and that the cursor is within the text portion of the list item. Then, the program instructions set the current document position to the new document position, which immediately follows the list item 34's end tag 34B. Then, the program instructions insert a new list item element 35 at the current document position. Then, the program instructions position the cursor 54 at the document position which immediately follows the begin tag for the new list item 35. A new list item element begin tag and end tag are inserted between the existing image elements 34 and 36. In this manner, it is seen that the Enter key has been given two different editing functions, which are selectively performed, depending upon the location of the cursor within the sequence of image elements.

MORE DETAILED DESCRIPTION OF THE INVENTION

Active Intent Interpretation

This function provides support for manipulating commonly used elements based on the user's selection from a small set of keystrokes. The function defined for each keystroke within that set is based on the current environment of the document, and is described below:

Enter Key

Figure 9:
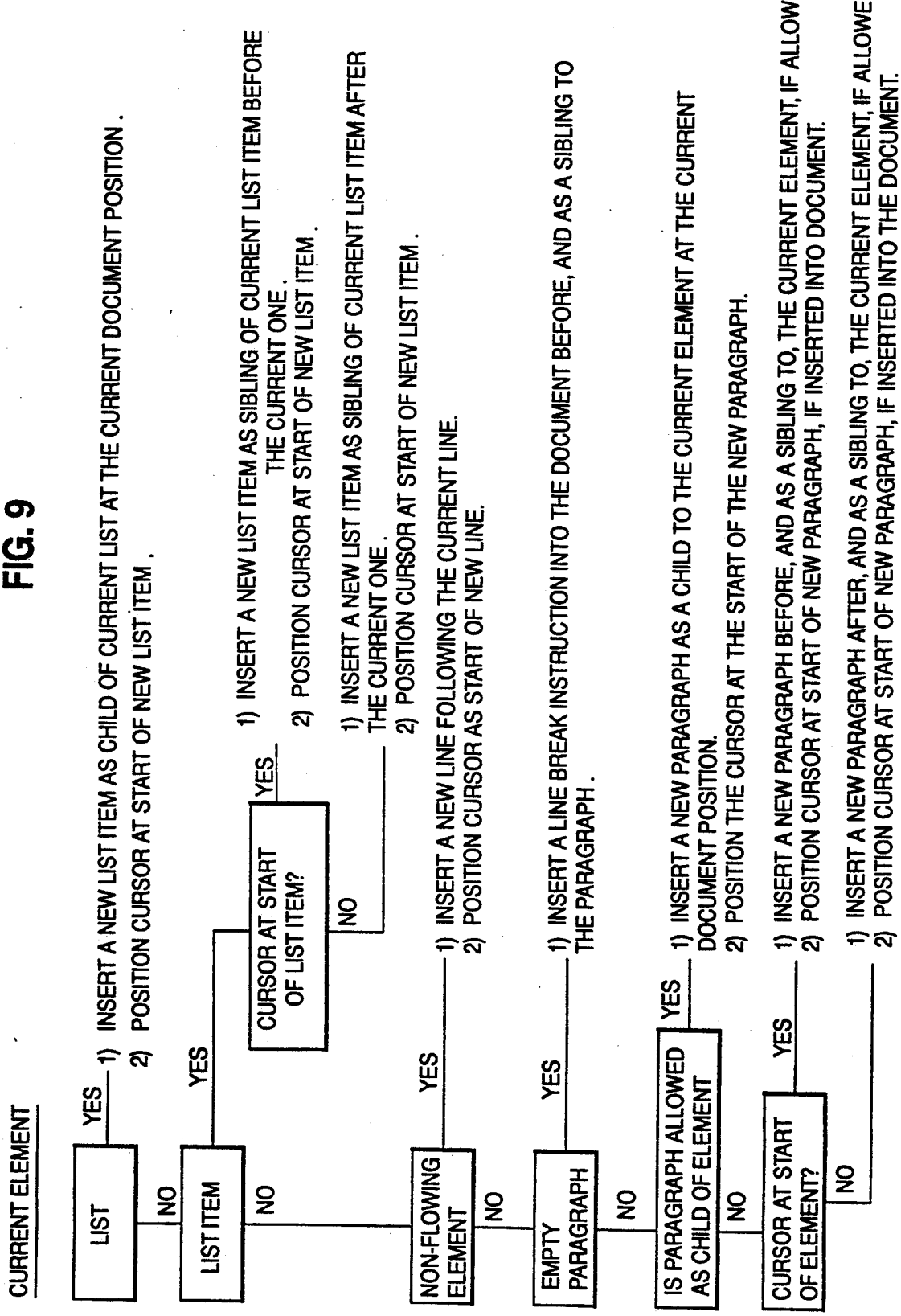
FIG. 9 is a flow diagram for enter key functions.

The function defined for the Enter key is based on the current document position, as can be seen with the reference to the flow diagram of FIG. 9. The first three items deal specifically with inserting and manipulating List Item elements, whereas the last items deal with elements in a more general manner. The action taken in response to the Enter key is described by the first item which accurately describes the current document position (the current document position or the cursor position is depicted with an asterisk "*"): Positioned within a List Element—if the current document position is within a List element (but not within a List Item for that list), a new List Item element is inserted at the current document position as a child of that List Element (and as a sibling to the List Items within that list). The cursor is then positioned at the start of that new List Item. Example document section before execution of Active Intent Interpretation:

---

[list]*
   [li]This is the first original list item.[/li]
   [li]This is the second original list item.[/li]
[/list]

---

Example document section after execution of Active Intent Interpretation:

---

[list]
   [li]*[/li]
   [li]This is the first original list item.[/li]
   [li]This is the second original list iten [/li]
[/list]

---

Positioned at Start of a List

Item—if the current document position is at the start of a List Item element (before any of its contents), a new List Item element is inserted into the document BEFORE, and as a sibling to, the current List Item element. The cursor is then positioned at the start of that new List Item.

Example document section before execution of Active Intent Interpretation:

```
[list]
    [li]*This is the first original list item.[/li]
    [li]This is the second original list item.[/li]
[/list]
```

Example document section after execution of Active Intent Interpretation:

```
[list]
    [li]*[/li]
    [li]This is the first original list item.[/li]
    [li]This is the second original list item.[/li]
[/list]
```

Positioned within a List Item—if the current document position is within a List Item element (but not at the start of that element), a new List Item element is inserted into the document AFTER, and as a sibling to, the current List Item element. The cursor is then positioned at the start of that new List Item.

Example document section before execution of Active Intent Interpretation:

```
[list]
    [li]This is the first *original list item.[/li]
    [li]This is the second original list item.[/li]
[/list]
```

Example document section after execution of Active Intent Interpretation:

```
[list]
    [li]This is the first original list item.[/li]
    [li]*[/li]
    [li]This is the second original list item.[/li]
[/list]
```

Any non-flowing element—if the current document position is within an element which does not automatically reflow its text content, a new Line is inserted into the document following the Line containing the current document position. The cursor is then positioned at the start of that new Line.

Example document section before execution of Active Intent Interpretation:

```
[lines]
    This is the *first original line.
    This is the second original line.
[/lines]
```

Example document section after execution of Active Intent Interpretation:

```
[lines]
    This is the first original line.
    *
    This is the second original line.
[/lines]
```

Positioned within an empty Paragraph—if the current document position is within an empty Paragraph, a Line Break Instruction is inserted into the document before, and as a sibling to, that Paragraph. The position of the cursor within the empty Paragraph remains unchanged, though the document will appear with another blank line preceding the Paragraph.

Example document section before execution of Active Intent Interpretation:

```
[p]This is a previous paragraph.[/p]
[p]*[/p]
```

Example document section after execution of Active Intent Interpretation:

```
[p]This is a previous paragraph.[/p]
[Line Break Processing Instruction]
[p]*[/p]
```

All other document positions—If allowed, a Paragraph is inserted at the current document position as a child of the current element and the cursor is positioned at the start of the new Paragraph.

Example document section before execution of Active Intent Interpretation:

```
[h1]*
    [p]This is a paragraph of text.[/p]
[/h1]
```

Example document section after execution of Active Intent Interpretation:

```
[h1]
    [p]*[/p]
    [p]This is a paragraph of text.[/p]
[/h1]
```

If a Paragraph is not allowed as a child, then:
a. if the cursor is at the start of the current element, a Paragraph is inserted BEFORE, and as a sibling to, the current element and the cursor is positioned at the start of that new Paragraph. If a Paragraph is not allowed at that position, selecting Enter has no affect.

Example document section before execution of Active Intent Interpretation:

```
[p]This is a preceeding paragraph.[/p]
[p]*This is a paragraph of text.[/p]
[p]This is a following paragraph.[/p]
```

Example document section after execution of Active Intent Interpretation:

```
[p]This is a preceeding paragraph.[/p]
[p]*[/p]
```

```
[p]This is a paragraph of text.[/p]
[p]This is a following paragraph.[/p]
``` b. if the cursor is within the current element, but not at the start of that element, a Paragraph is inserted AFTER, and as a sibling to, the current element and the cursor is positioned at the start of the new Paragraph. If a Paragraph is not allowed at that position, selecting Enter has no affect.

Example document section before execution of Active Intent Interpretation:

```
[p]This is a preceeding paragraph.[/p]
[p]This is a *paragraph of text.[/p]
[p]This is a following paragraph.[/p]
```

Example document section after execution of Active Intent Interpretation:

```
[p]This is a preceeding paragraph.[/p]
[p]This is a paragraph of text.[/p]
[p]*[/p]
[p]This is a following paragraph.[/p]
```

Logic Flow in Response to Enter Key

If the current document position is in a List element:
1) Insert a new List Item element at the current document position
2) Position the cursor at the start of the new List Item Else If the current document position is in a List Item element:

If the current document position preceeds any contents in the List Item:
1) Set the current document position to the document position which immediately preceeds the List Item begin tag.
2) Insert a new List Item element at the current document position
3) Position the cursor at the document position which immediately follows the begin for the new List Item.

Otherwise:
1) Set the current document position to the document position which immediately follows the List Item end tag.
2) Insert a new List Item element at the current document position
3) Position the cursor at the document position which immediately follows the begin for the new List Item.

Else If the 'non-flowing' attribute is specified for the current element:
1) Insert a new line immediately following the line on which the current document position resides.

Else If the current element is a paragraph with no contents:
1) Set the current document position to the document position which immediately preceeds the begin tag for the current element.
2) Insert a line break instruction at the current document position.
3) Set the current document position to the document position which immediately follows the next begin tag (which will be the begin tag for the paragraph originally in).

Else If the Tag Set Definition allows a paragraph to be inserted as a child to the current element:
1) Insert new a paragraph at the current document position.
2) Set the current document position to the document position which immediately follows the begin tag of the newly added paragraph.

Else If the current document position preceeds any text in the Current Element:
1) Set the current document position to the document position which immediately preceeds the current element's begin tag.
2) If the Tag Set Definition allows a paragraph to be inserted as a child to the current element:
   1) Insert a new Paragraph element at the current document position
   2) Position the cursor at the document position which immediately follows the begin for the new Paragraph.

Otherwise:
1) Set the current document position to the document position which immediately follows the current element's end tag.
2) If the Tag Set Definition allows a paragraph to be inserted as a child to the current element:
   1) Insert a new Paragraph element at the current document position
   2) Position the cursor at the document position which immediately follows the begin for the new Paragraph.

Delete Key

The function defined for the Delete (Del) key is based on the current document position, as can be seen with reference to FIG. 10. The action taken in response to the Del key is described by the first item which accurately describes the current document position:

1.) Positioned at a Text Character or Processing Instruction if the current document position is related to a Text Character, that Text Character is deleted from the document, and the Text following that character will be shifted over appropriately. The cursor position is not changed relative to the contents of the document.

Example document section before execution of Active Intent Interpretation:

```
[p]This is a *paragraph of text.[/p]
```

Example document section after execution of Active Intent Interpretation:

```
[p]This is a *aragraph of text.[/p]
```

2.) Positioned within an empty last List Item—if the current document position is within the last List Item and that List Item is empty, the List Item is deleted and the cursor is moved to the start of the next element.

Example document section before execution of Active Intent Interpretation:

```
[odoc]        [-- Top Level Element
  [list]
    [li]This is the first original list item.[/li]
    [li]This is the second original list item.[/li]
    [li]*[/li]
  [/list]
```

```
    [p]This is a following paragraph.[/p]
[/odoc]
```

Example document section after execution of Active Intent Interpretation:

```
[odoc]          [-- Top Level Element
    [list]
        [li]This is the first original list item.[/li]
        [li]This is the second original list item.[/li]
    [/list]
    [p]*This is a following paragraph.[/p]
[/odoc]
```

If there is no next element and the current List is not nested within another List, a new Paragraph is inserted into the document after, and as a sibling to, the List containing the List Item just deleted. The cursor is then positioned at the start of that new Paragraph.

Example document section before execution of Active Intent Interpretation:

```
[odoc]          [-- Top Level Element
    [list]
        [li]This is the first original list item.[/li]
        [li]This is the second original list item.[/li]
        [li]*[/li]
    [/list]
[/odoc]
```

Example document section after execution of Active Intent Interpretation:

```
[odoc]          [-- Top Level Element
    [list]
        [li]This is the first original list item.[/li]
        [li]This is the second original list item.[/li]
    [/list]
    [p]*[/p]
[/odoc]
```

If there is no next element and the current List IS nested within another List, a new List Item is inserted into the document instead of a new Paragraph as just described, and the cursor is positioned at the start of that new List Item.

Example document section before execution of Active Intent Interpretation:

```
[odoc]
    [list]
        [li]This is a list item containing another list.[/li]
            [list]
                [li]This is the first original list item.[/li]
                [li]This is the second original list item.[/li]
                [li]*[/li]
            [/list]
    [/list]
[/odoc]
```

Example document section after execution of Active Intent Interpretation:

```
[odoc]
```

```
    [list]
        [li]This is a list item containing another list.[/li]
            [list]
                [li]This is the first original list item.[/li]
                [li]This is the second original list item.[/li]
            [/list]
        [li]*[/li]
    [/list]
[/odoc]
```

Note that if all List Items within the List have been deleted, the List element will also be deleted for both of the above two cases.

Example document section before execution of Active Intent Interpretation:

```
[odoc]
    [list]
        [li]This is a list item containing another list.[/li]
            [list]
                [li]*[/li]
            [/list]
    [/list]
[/odoc]
```

Example document section after execution of Active Intent Interpretation:

```
[odoc]
    [list]
        [li]This is a list item containing another list.[/li]
        [li]*[/li]
    [/list]
[/odoc]
```

3.) Positioned within an empty line of a non-flowing element—if the current document position is within a non-flowing element and the current line is empty, the current line is deleted. The cursor will then be placed at the start of the following line, whether that line is within the current non-flowing element or outside of the element (in the event that the last line of the non-flowing element is deleted).

Example document section before execution of Active Intent Interpretation:

```
[p]This is a preceeding paragraph.[/p]
[lines]
    This is the first original line.
    This is the third original line.
[/lines]
[p]This is a following paragraph.[/p]
```

Example document section after execution of Active Intent Interpretation:

```
[p]This is a preceeding paragraph.[/p]
[lines]
    This is the first original line.
    *This is the third original line.
[/lines]
[p]This is a following paragraph.[/p]
```

Note that if all lines of the element have been deleted, the element itself is also deleted.

Example document section before execution of Active Intent Interpretation:

```
[p]This is a preceeding paragraph.[/p]
[lines]
     *
[/lines]
[p]This is a following paragraph.[/p]
```

Example document section after execution of Active Intent Interpretation:

```
[p]This is a preceeding paragraph.[/p]
[p]*This is a following paragraph.[/p]
```

4.) All other document positions—if the current element and its children do not contain text, the element and its contents are deleted. The cursor position is not changed relative to the contents of the document.

Example document section before execution of Active Intent Interpretation:

```
[p]Preceeding paragraph text.[/p]
[list]*
    [li][/li]
[/list]
[p]Following paragraph text.[/p]
```

Example document section after execution of Active Intent Interpretation:

```
[p]Preceeding paragraph text.[/p]*
[p]Following paragraph text.[/p]
```

If the element and/or its children contains text, then the user is informed that the element and all of its contents are about to be deleted from the document. At that point, the user may select to either keep the element and its contents or to have them deleted. If deletion is selected, then the element is deleted as described above. The cursor position is not changed relative to the contents of the document.

Logic Flow in Response to Delete Key

If the current document position is at a character or processing instruction:
1) Delete the character or processing instruction.
Else If the current element is a List Item element with no content and there are no List Item elements between the end tag for the current List Item and the end tag for its parent List element:
   1) If there is an element begin tag (for any element) which follows the end tag for the current List element:
       1) If there is a List Item element between the begin tag for the current List element and the begin tag for the current List Item element:
           1) Delete the current List Item element.
           2) Set the current document position at the document position which immediately follows the begin tag for the element following the end tag for the current List element.
       Else (there are no siblings to the current List Item element):
           1) Set the current document position at the document position which immediately follows the begin tag for the parent List element.
           2) Delete the List element at the current document position, removing its child List Item element as well.
           3) Set the current document position at the document position which immediately follows the begin tag for the element following the end tag for the List element just deleted.
   Else (there is no element begin tag following the List element):
       1) If the parent to the current List element is a List element:
           1) If there is a List Item element between the begin tag for the current List element and the begin tag for the current List Item element:
               1) Delete the current List Item element.
               2) Set the current document position at the document position which immediately follows the end tag for the current List element.
               3) Insert a new List Item element at the current document position.
               4) Set the current document position at the document position which immediately follows the begin tag for the newly inserted List Item element.
           Else (no siblings to the current List Item element):
               1) Set the current document position at the document position which immediately follows the begin tag for the parent List element.
               2) Delete the List element at the current document position, removing its child List Item element as well.
               3) Set the current document position at the document position which immediately followed the end tag of the List element just deleted.
               4) Insert a new List Item element at the current document position.
               5) Set the current document position at the document position which immediately follows the begin tag for the newly inserted List Item element.
       Else (the parent to the List element is not a List element):
           1) If the Tag Set Definition allows a paragraph to be inserted as a sibling to the current List element:
               1) If there is a List Item element between the begin tag for the current List element and the begin tag for the current List Item element:
                   1) Delete the current List Item element.
                   2) Set the current document position at the document position which immediately follows the end tag for the current List element.
                   3) Insert a new Paragraph element at the current document position.
                   4) Set the current document position at the document position which immediately follows the begin tag for the newly inserted Paragraph element.
               Else (no siblings to the current List Item element):
                   1) Set the current document position at the document position which immediately follows the begin tag for the parent List element.
                   2) Delete the List element at the current document position, removing its child List Item element as well.
                   3) Set the current document position at the document position which immediately followed the end tag of the List element just deleted.
                   4) Insert a new Paragraph element at the current document position
                   5) Set the current document position at the document position which immediately follows the begin tag for the newly inserted Paragraph element.

Else If the 'non-flowing' attribute is specified for the current element and the current line of that element contains no text:

1) If the current line is the only line within the current element:

1) Delete the current element

2) Set the current document position to the document position of the start of the next line in the document.

Else (there is more than one line within the current element):

1) Delete the current line

2) Set the current document position to the document position of the start of the next line in the document.

Else If the current element and/or its children contain text:

1) Prompt the user to confirm the deletion of the current element.

2) If the user confirms the deletion:

1) Delete the current element

Otherwise:

1) Delete the current element

Backspace (Destructive)

The function defined for the Backspace (destructive) key is based on the current document position, as can be seen with reference to the flow diagram of FIG. 11. The action taken in response to the Backspace key is described by the first item which accurately describes the current document position:

1.) Positioned following a text character or processing instruction—if the current document position immediately follows a text character, that character is deleted from the document. The cursor position is not changed relative to the contents of the document.

Example document section before execution of Active Intent Interpretation:

```
[p]This is a pa*ragraph of text.[/p]
```

Example document section after execution of Active Intent Interpretation:

```
[p]This is a p*ragraph of text.[/p]
```

2.) Positioned within an empty list item within a list containing only one list item—both the list item and its parent list are deleted. The cursor position is not changed relative to the contents of the document.

Example document section before execution of Active Intent Interpretation:

```
[odoc]      [-- Top Level Element
  [p]This is a preceeding paragraph.[/p]
  [list]
    [li]*[/li]
  [/list]
  [p]This is a following paragraph.[/p]
[/odoc]
```

Example document section after execution of Active Intent Interpretation:

```
[odoc]      [-- Top Level Element
  [p]This is a preceeding paragraph.[/p]*
  [p]This is a following paragraph.[/p]
[/odoc]
```

3.) Positioned within an empty line of a non-flowing element—if the current document position is within a non-flowing element and the current line is empty, the current line is deleted. Note that if the deleted line is the only line within the non-flowing element, the entire element will also be deleted. The cursor position is not changed relative to the contents of the document.

Example document section before execution of Active Intent Interpretation:

```
[p]This is a preceeding paragraph.[/p]
[lines]
    This is the first original line.
    *
    This is the third original line.
[/lines]
[p]This is a following paragraph.[/p]
```

Example document section after execution of Active Intent Interpretation:

```
[p]This is a preceeding paragraph.[/p]
[lines]
    This is the first original line.*
    This is the third original line.
[/lines]
[p]This is a following paragraph.[/p]
```

Positioned at the boundary of an element containing text—if the current document position is related to the start/end tags for an element whose contents (or children's contents) include text, the user is informed that the element and all of its contents are about to be deleted from the document. At that point, the user may select to either keep the element and its contents or to have them deleted. If deletion is selected, the cursor is moved to the document position immediately preceding the location from which the element was deleted.

Example document section before execution of Active Intent Interpretation:

```
[p]Preceeding paragraph text.[/p]
[list]
    [li]User confirms deletion of list/list item.[/li]
[/list]*
[p]Following paragraph text.[/p]
```

Example document section after execution of Active Intent Interpretation:

```
[p]Preceeding paragraph text.[/p]*
[p]Following paragraph text.[/p]
```

All other document positions—if the current element and its children do not contain text, the element and its contents are deleted and the cursor is moved to the document position immediately preceding the location from which the element was deleted.

Example document section before execution of Active Intent Interpretation:

```
[p]Preceeding paragraph text.[/p]
[list]
    [li][/li]
[/list]*
[p]Following paragraph text.[/p]
```

Example document section after execution of Active Intent Interpretation:

```
[p]Preceeding paragraph text.[/p]*
[p]Following paragraph text.[/p]
```

Logic Flow in Response to Backspace (Destructive) Key

If the current document position follows a character or processing instruction:
1) Delete the character or processing instruction.
Else If the current document position is within (or immediately follows the end tag for) a List Item element with no content which is the only List Item element within the parent List element:
 1) Set the current document position to the document position immediately following the begin tag for the parent List element.
 2) Delete the current List element.
Else If the 'non-flowing' attribute is specified for the current element and the current line of that element contains no text:
 1) If the current line is the only line within the current element:
  1) Delete the current element
  2) Set the current document position to the document position of the end of the previous line in the document.
 Else (there is more than one line within the current element):
  1) Delete the current line.
  2) Set the current document position to the document position of the end of the previous line in the document.
Else If the current element and/or its children contain text:
 1) Prompt the user to confirm the deletion of the current element.
 2) If the user confirms the deletion:
  1) Delete the current element
 Otherwise:
  1) Delete the current element Tab Key The function defined for the Tab key is based on the current document position, as can be seen with reference to the flow diagram of FIG. 12. The action taken in response to the Tab key is described by the first item which accurately describes the current document position:

1.) Positioned within an empty Paragraph—if the cursor is positioned within an empty Paragraph, the Paragraph is changed to a Simple List, a new List Item is inserted as a child to the new Simple List and the cursor is positioned at the start of the new List Item.

Example document section before execution of Active Intent Interpretation:

```
[p]Preceeding paragraph text.[/p]
```

```
[p]*[/p]
[p]Following paragraph text.[/p]
```

Example document section after execution of Active Intent Interpretation:

```
[p]Preceeding paragraph text.[/p]
[list form=simple]
    [li]*[/li]
[/list]
[p]Following paragraph text.[/p]
```

2.) Positioned on the only list item in a simple list whose contents consists of a single character "1", "A" or "a"—the simple list is changed to an ordered list and the cursor is positioned at the start of the first list item. The contents of the first List Item will be removed, since the formatting of the List Item will automatically generate the ordered numbers which were just entered by the user.

Example document section before execution of Active Intent Interpretation:

```
[p]Preceeding paragraph text.[/p]
[list form=simple]
    [li]1*[/li]
[/list]
[p]Following paragraph text.[/p]
```

Example document section after execution of Active Intent Interpretation:

```
[p]Preceeding paragraph text.[/p]
[list form=ordered]
    [li]*[/li]
[/list]
[p]Following paragraph text.[/p]
```

3.) Positioned within an empty List Item—if the cursor is positioned within an empty List Item which is not the only List Item within the current List, the List Item is changed to a Simple List, a new List Item is inserted as a child to the new Simple List and the cursor is positioned at the start of the new List Item. This allows the user to create a list as a child to the current list be pressing Tab on an empty List Item within the current list.

Example document section before execution of Active Intent Interpretation:

```
[p]Preceeding paragraph text.[/p]
[list]
    [li]Preceeding List Item.[/li]
    [li]*[/li]
    [li]Following List Item.[/li]
[/list]
[p]Following paragraph text.[/p]
```

Example document section after execution of Active Intent Interpretation:

```
[p]Preceeding paragraph text.[/p]
[list]
    [li]Preceeding List Item.[/li]
    [list form=simple]
```

-continued

```
        [li]*[/li]
    [/list]
        [li]Following List Item.[/li]
    [/list]
[p]Following paragraph text.[/p]
```

4.) All other document positions—move the cursor to the start of the next element which is allowed to contain text, or to the next tab character, whichever comes first.

Example document section before execution of Active Intent Interpretation:

```
[p]Preceeding paragraph text.[/p]
[p]This is a *paragraph also.[/p]
[p]Following paragraph text.[/p]
```

Example document section after execution of Active Intent Interpretation:

```
[p]Preceeding paragraph text.[/p]
[p]This is a paragraph also.[/p]
[p]*Following paragraph text.[/p]
```

Logic Flow in Response to Tab Key

If the current element is a Paragraph element with no content:

1) Replace the Paragraph begin and end tags with the begin and end tags for a List element.
2) Set the current document position to the document position which is between the List element begin and end tags.
3) Set the format of the List element to "Simple" list.
4) Insert the begin and end tags for a List Item element at the current document position.
5) Set the current document position to the document position which is between the List Item element begin and end tags.

Else If the current element is a List Item element with no content and there is at least one other List Item element within the parent List element:

1) Replace the List Item begin and end tags with the begin and end tags for a List element.
2) Set the current document position to the document position which is between the List element begin and end tags.
3) Set the format of the new List element to "Simple" list.
4) Insert the begin and end tags for a List Item element at the current document position.
5) Set the current document position to the document position which is between the List Item element begin and end tags.

Otherwise:

1) Set the current document position to the document position of the next element begin tag or tab character, whichever comes first.

Period

If the current element is the only list item within a simple list and the Period key is pressed so that a period "." is typed as the second character and follows the character "1", "A" or "a"; the simple list is changed to an ordered list and the cursor is positioned at the start of the first list item. The contents of the first List Item will be removed, since the formatting of the List Item will automatically generate the ordered numbers which were just entered by the user.

Example document section before execution of Active Intent Interpretation:

| | |
|---|---|
| [p]Preceeding paragraph text.[/p] | "Preceeding ..." |
| [list form=simple] | |
|   [li]1*[/li] | "1*" |
| [/list] | |
| [p]Following paragraph text.[/p] | "Following ..." |

Example document section after execution of Active Intent Interpretation in response to typing a period ".":

| | |
|---|---|
| [p]Preceeding paragraph text.[/p] | "Preceeding ..." |
| [list form=ordered] | |
|   [li]*[/li] | "1. *" |
| [/list] | |
| [p]Following paragraph text.[/p] | "Following ..." |

In all other cases, the period is inserted into the document at the current cursor position.

Logic Flow in Response to the Period Key

If the current element is a List Item whose content consists of the single character "1", "A" or "a" and whose parent List element is of type Simple List consisting of only one List Item element:

1) Change the format of the parent List element from "Simple" list to "Ordered" list.
2) Delete the single character within the current List Item element.
3) Set the current document position to the document position which is between the List Item element begin and end tags.

Character ")"

If the current element is the only list item within a simple list and the close-parenthesis key is pressed so that a ")" character is typed as the second character and follows the character "1", "A" or "a"; the simple list is changed to an ordered list and the cursor is positioned at the start of the first list item. The contents of the first List Item will be removed, since the formatting of the List Item will automatically generate the ordered numbers which were just entered by the user.

Example document section before execution of Active Intent Interpretation:

| | |
|---|---|
| [p]Preceeding paragraph text.[/p] | "Preceeding ..." |
| [list form=simple] | |
|   [li]A*[/li] | "A*" |
| [/list] | |
| [p]Following paragraph text.[/p] | "Following ..." |

Example document section after execution of Active Intent Interpretation in response to typing the ")" character:

| | |
|---|---|
| [p]Preceeding paragraph text.[/p] | "Preceeding ..." |
| [list form=ordered] | |
|   [li]*[/li] | "A.*" |
| [/list] | |
| [p]Following paragraph text.[/p] | "Following ..." |

In all other cases, the ")" is inserted into the document at the current cursor position.

Logic Flow in Response to the ")" Key

If the current element is a List Item whose content consists of the single character "1", "A" or "a" and whose parent List element is of type Simple List consisting of only one List Item element:

1) Change the format of the parent List element from "Simple" list to "Ordered" list.

2) Delete the single character within the current List Item element.

3) Set the current document position to the document position which is between the List Item element begin and end tags.

Characters "o", "*", "−", "+", and "]"

If the current element is the only list item within a simple list and the lower case "o" key, the "*" asterisk key, the minus "−" key, the plus "+" key or the close-bracket "]" key is pressed so that the character is typed as the first character in this element, the simple list is changed to a bulleted list, the cursor is positioned at the start of the first list item. The contents of the first List Item will be removed, since the formatting of the List Item will automatically generate the bullets, the first of which was just entered by the user.

Example document section before execution of Active Intent Interpretation:

| | |
|---|---|
| [p]Preceeding paragraph text.[/p] | "Preceeding . . . " |
| [list form=simple] | |
| [li]*[/li] | |
| [/list] | |
| [p]Following paragraph text.[/p] | "Following . . . " |

Example document section after execution of Active Intent Interpretation in response to typing the minus "−" character:

| | |
|---|---|
| [p]Preceeding paragraph text.[/p] | "Preceeding . . . " |
| [list form=unordered] | |
| [li]*[/li] | "− *" |
| [/list] | |
| [p]Following paragraph text.[/p] | "Following . . . " |

In all other cases, the character is inserted into the document at the current cursor position.

Logic Flow in Response to the "o," "*," "−," "+," or "]" Key

If the current element is a List Item with no content whose parent List element is of type Simple List consisting of only one List Item element:

1) Change the format of the parent List element from "Simple" list to "Unordered" list.

The resulting invention provides the ability to interpret a user's action based upon the current document position and environment, and to invoke an appropriate response to that action based on the user's intent given the current document position.

Although a specific embodiment of the invention has been disclosed, it will be understood by those having skill in the art, that changes can be made to the specific embodiment without departing from the spirit and the scope of the invention. In the disclosed embodiment, a particular memory organization was described. However any memory organization is sufficient for the implementation of the invention.

What is claimed is:

1. In a data processing system including a processor for executing program instructions, a display device coupled to said processor for displaying a plurality of images in an ordered sequence in response to said program instructions, and a keyboard coupled to said processor having a function key, said display device including a cursor displayed thereon and related to a selected location in said sequence of images where a result of actuating said function key is to have effect, a method for selecting one of a plurality of text editing functions to be performed when said function key is actuated, based on the location of said cursor in said sequence of images, comprising the steps of:

storing said plurality of images in said system in association with an image type value and a sequence indication;

storing a plurality of text editing instruction routines, each routine corresponding to one of said plurality of functions of said function key and related to said image type value;

displaying at least a portion of said plurality of images on said display device and displaying said cursor at a selected cursor location thereon;

identifying a focal image of said plurality of images in said sequence, having a sequence indication related to said selected cursor location;

identifying a preceding image of said plurality of images in said sequence which is adjacent to and precedes said focal image in said sequence;

accessing a selected text editing instruction routine from said plurality of instruction routines, based on said image type value of said focal image and an image type value of said preceding image;

executing said accessed text editing instruction routine to perform a selected one function of said plurality of functions of said focal image.

2. In a document editing system including a processor for executing program instructions stored in a memory coupled to said processor, a display device coupled to said processor for displaying a plurality of document images in an ordered sequence specified by a corresponding ordered sequence of a plurality of image control elements controlled by said program instructions, and a keyboard coupled to said processor having a function key, said display device including a cursor displayed thereon and related to a current document position in said sequence of image control elements where a result of actuating said function key is to have effect, a method for selecting one of a plurality of editing functions represented by said program instructions, to be performed when said function key is actuated, based on a location of said cursor in said sequence of image control elements, comprising the steps of:

storing said plurality of image control elements in said system in association with an control element type value and a control element sequence indication;

storing a plurality of instruction routines in said memory, each routine corresponding to one of said plurality of editing functions of said function key and related to said control element type value;

displaying at least a portion of said plurality of document images on said display device corresponding to at least a portion of said plurality of image control elements and displaying said cursor at a selected current document position thereon;

identifying a focal image control element of said plurality of image control elements in said control element sequence, having a sequence indication related to said selected current document position;

identifying a preceding image control element of said plurality of image control elements in said control element sequence, which is adjacent to and precedes said focal image control element in said control element sequence;

accessing a selected instruction routine from said plurality of instruction routines, based on said control element type value of said focal image control element and a control element type value of said preceding image control element;

executing said accessed instruction routine to perform a selected one editing function of said plurality of functions on said focal image control element.

3. The method of claim 2 wherein said function key is an Enter Key, said image control element type value corresponds to a List element and said selected editing function is:
1) Insert a List Item element at the current document position;
2) Position the cursor at a start of the List Item element.

4. The method of claim 2 wherein said function key is an Enter Key, said image control element type value corresponds to a List Item element and the current document position precedes any text in a List Item, and said selected editing function is:
1) Set the current document position to a document position which immediately precedes a List Item begin tag;
2) Insert a List Item element at the current document position;
3) Position the cursor at a document position which immediately follows a begin tag for the List Item.

5. The method of claim 2 wherein said function key is an Enter Key, said image control element type value corresponds to a List Item element and the current document position does not precede any text in the List Item, and said selected editing function is:
1) Set the current document position to a document position which immediately precedes a List Item end tag;
2) Insert a List Item element at the current document position;
3) Position the cursor at a document position which immediately follows a begin tag for the List Item.

6. The method of claim 2 wherein said function key is an Enter Key, said image control element type value corresponds to a "non-flowing" attribute specified for a current element and said selected editing function is:
insert a line immediately following the line on which the current document position resides.

7. The method of claim 2 wherein said function key is an Enter Key, said image control element type value corresponds to a paragraph with no contents and said selected editing function is:
1) Set the current document position to a document position which immediately precedes a begin tag for a current element;
2) Insert a line break instruction at the current document position;

3) Set the current document position to a document position which immediately follows a next begin tag.

8. The method of claim 2 wherein said function key is an Enter Key, a Tag Set Definition allows a paragraph to be inserted as a child to a current element, and said selected editing function is:
1) Insert a paragraph at the current document position;
2) Set the current document position to a document position which immediately follows a begin tag of the newly inserted paragraph.

9. The method of claim 2 wherein said function key is an Enter Key, the current document position precedes any text in a List Item and said selected editing function is:
1) Set the current document position to a document position which immediately precedes a begin tag of a current element;
2) If a Tag Set Definition allows a paragraph to be inserted as a child to the current element:
a) Insert a Paragraph element at the current document position;
b) Position the cursor at a document position which immediately follows a begin tag for the Paragraph.

10. The method of claim 2 wherein said function key is an Enter Key, and said selected editing function is:
1) Set the current document position to a document position which immediately follows a current element's end tag;
2) If a Tag Set Definition allows a paragraph to be inserted as a child to a current element, then
a) Insert a Paragraph element at the current document position;
b) Position the cursor at a document position which immediately follows a begin tag for the Paragraph.

11. The method of claim 2 wherein said function key is a Delete Key, said image control element type value corresponds to a character and said selected editing function is:
1) Delete the character.

12. The method of claim 2 wherein said function key is a Delete Key, said image control element type value corresponds to a List Item element with no content and there are no List Item elements between an end tag for a current List item and an end tag for its parent List element, there is an element begin tag for any element which follows an end tag for a current List element, there is a List Item element between a begin tag for a current List element and the begin tag for a current List Item element, and said selected editing function is:
1) Delete the current List Item element;
2) Set the current document position at a document position which immediately follows a begin tag for the element following the end tag for the current List element.

13. The method of claim 2 wherein said function key is a Delete Key, said image control element type value corresponds to a List Item element, there are no siblings to a current List Item element, and said selected editing function is:
1) Set the current document position at a document position which immediately follows a begin tag for a parent List element;
2) Delete a List element at the current document position and remove its child List Item element;

3) Set the current document position at a document position which immediately follows a begin tag for an element following an end tag for the List element which was just deleted.

14. The method of claim 2 wherein said function key is a Delete Key, said image control element type value corresponds to a List Item element, there is no element begin tag following the List element, a parent to a current List element is a List element, there is a List Item element between a begin tag for the current List element and the begin tag for the current List Item element, and said selected editing function is:
   1) Delete the current List Item element;
   2) Set the current document position at a document position which immediately follows an end tag for the current List element;
   3) Insert a List Item element at the current document position;
   4) Set the current document position at a document position which immediately follows a begin tag for the newly inserted List Item element.

15. The method of claim 2 wherein said function key is a Delete Key, said image control element type value corresponds to a List Item element, there are no siblings to a current List Item element and said selected editing function is:
   1) Set the current document position at a document position which immediately follows a begin tag for a parent List element;
   2) Delete the List element at the current document position, removing its child List Item element as well;
   3) Set the current document position at a document position which immediately follows an end tag of the List element which was just deleted;
   4) Insert a List Item element at the current document position;
   5) Set the current document position at a document position which immediately follows a begin tag for the newly inserted List Item element.

16. The method of claim 2 wherein said function key is a Delete Key, said image control element type value corresponds to a List Item element, a parent to a List element is an element different from a List element, a Tag Set Definition allows a paragraph to be inserted as a child inserted as a sibling to a current List element, there is a List Item element between a begin tag for the current List element and a begin tag for a current List Item element, and said selected editing function is:
   1) Delete the current List Item element;
   2) Set the current document position at a document position which immediately follows an end tag for the current List element;
   3) Insert a Paragraph element at the current document position;
   4) Set the current document position at a document position which immediately follows a begin tag for the newly inserted Paragraph element.

17. The method of claim 2 wherein said function key is a Delete Key, said image control element type value corresponds to a "non-flowing" attribute specified for a current element, a current line of that element contains no text and said selected editing function is:
   1) Delete the current element;
   2) Set the current document position to a document position of a start of a next line in a document.

18. The method of claim 17 wherein there is more than one line within the current element and said selected editing function is:
   1) Delete the current line;
   2) Set the current document position to a document position of the start of a next line in the document.

19. The method of claim 2 wherein said function key is a Delete Key, said image control element type value corresponds to a current element containing text and said selected editing function is:
   1) Prompt a user to confirm deletion of the current element;
   2) If a user confirms a deletion:
      a) Delete the current element.

20. The method of claim 2 wherein said function key is a Backspace Key, said image control element type value corresponds to a character and said selected editing function is:
   1) Delete the character.

21. The method of claim 2 wherein said function key is a Backspace Key, said image control element type value corresponds to a List Item element with no content which is the only List Item element within a parent List element and said selected editing function is:
   1) Set the current document position to a document position immediately following a begin tag for the parent List element;
   2) Delete a current List element.

22. The method of claim 2 wherein said function key is a Backspace Key, said image control element type value corresponds to a "non-flowing" attribute specified for the current element, a current line of that element contains no text, and said selected editing function is:
   1) Delete the current element;
   2) Set the current document position to a document position at an end of a previous line in a document.

23. The method of claim 2 wherein there is more than one line within the current element and said selected editing function is:
   1) Delete a current line;
   2) Set the current document position to a document position at an end of a previous line in a document.

24. The method of claim 2 wherein said function key is a Backspace Key, said image control element type value corresponds to a current element containing text and said selected editing function is:
   1) Prompt the user to confirm the deletion of the current element;
   2) If a user confirms a deletion:
      1) Delete the current element.

25. The method of claim 2 wherein said function key is a Tab Key, said image control element type value corresponds to a Paragraph element with no content and said selected editing function is:
   1) Replace a Paragraph begin and end tags with begin and end tags for a List element;
   2) Set the current document position to a document position which is between the List element begin and end tags;
   3) Set a format of the List element to "Simple" list;
   4) Insert begin and end tags for a List Item element at the current document position;
   5) Set the current document position to a document position which is between the List Item element begin and end tags.

26. The method of claim 2 wherein said function key is a Tab Key, said image control element type value corresponds to a List Item element with no content and there is at least one other List Item element within a parent List element and said selected editing function is:
1) Replace a List Item's begin and end tags with begin and end tags for a List element;
2) Set the current document position to a document position which is between the List element begin and end tags;
3) Set a format of a List element to "Simple" list;
4) Insert a begin and end tags for a List Item element at the current document position;
5) Set the current document position to a document position which is between the List Item element begin and end tags.

27. The method of claim 2 wherein said function key is a Tab Key, said image control element type value corresponds to a paragraph element and said selected editing function is:
1) Set the current document position to a document position of a next element begin tag or tab character, whichever comes first.

28. The method of claim 2 wherein said function key is a Tab Key, said image control element type value corresponds to a List Item element and said selected editing function is:
1) Set the current document position to a document position of a next element begin tag or tab character, whichever comes first.

29. The method of claim 2 wherein said function key is a Period Key, said image control element type value corresponds to a List Item whose content consists of the single character "1", "A" or "a" and whose parent List element is of type Simple List consisting of only one List Item element and said selected editing function is:
1) Change a format of the parent List element from "Simple" list to "Ordered" list;
2) Delete the single character within a current List Item element;
3) Set the current document position to a document position which is between a List Item element begin and end tags.

30. The method of claim 2 wherein said function key is a Character ")" Key, said image control element type value corresponds to a List Item whose content consists of the single character "1", "A" or "a" and whose parent List element is of type Simple List consisting of only one List Item element and said selected editing function is:
1) Change a format of the parent List element from "Simple" list to "Ordered" list;
2) Delete the single character within a current List Item element;
3) Set the current document position to a document position which is between a List Item element begin and end tags.

31. The method of claim 2 wherein said function key is a character key taken from the group consisting of "o", "*", "—", "+" and "]", said image control element type value corresponds to a List Item with no content whose parent List element is of type Simple List consisting of only one List Item element and said selected editing function is:
1) Change a format of the parent List element from "Simple" list to "Unordered" list.

* * * * *